No. 780,475.  
Patented January 17, 1905.

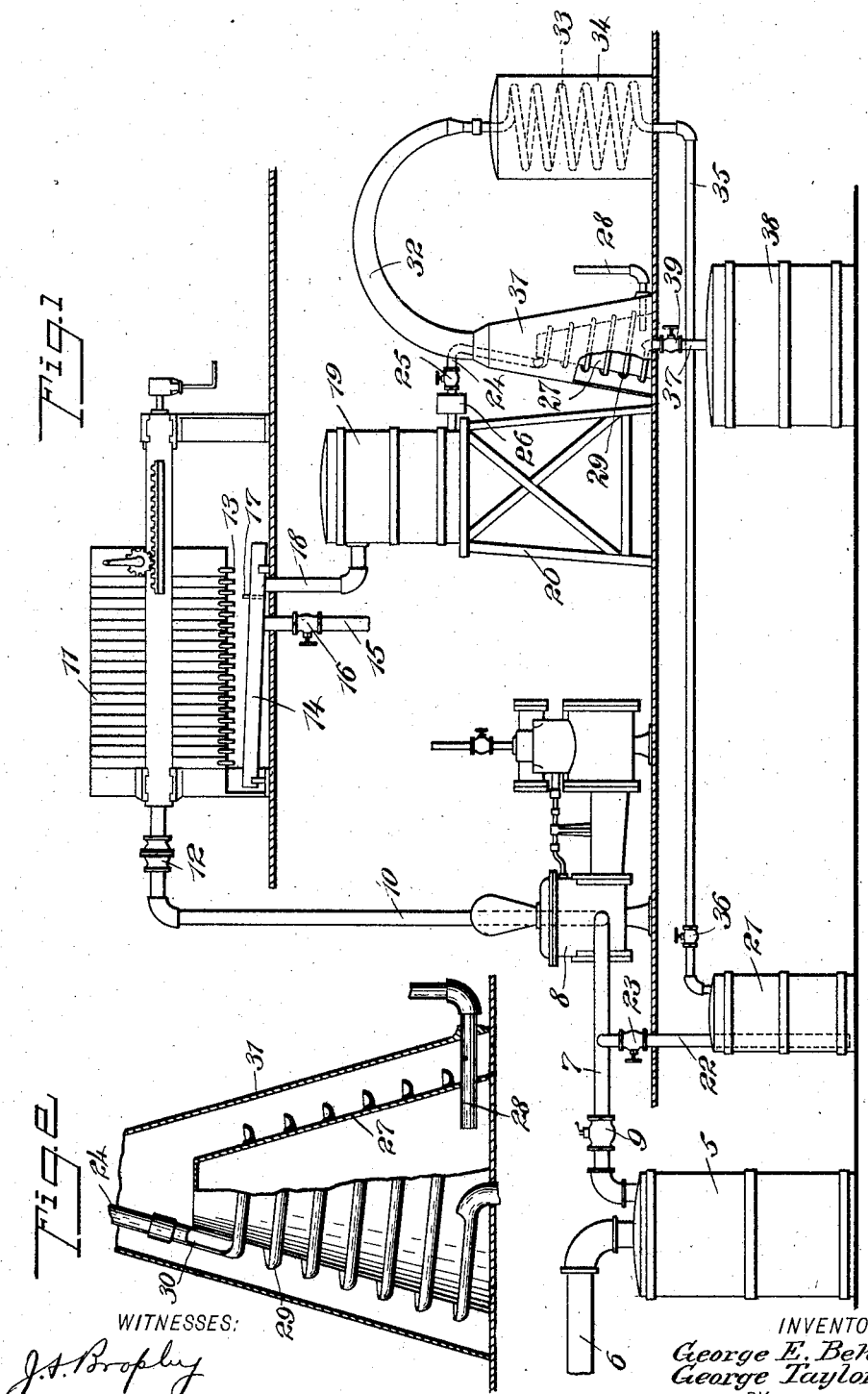

UNITED STATES PATENT OFFICE.

GEORGE E. BEHRENS, OF IVORYTON, CONNECTICUT, AND GEORGE TAYLOR, OF NEW YORK, N. Y.

APPARATUS FOR TREATING WOOL-WASH WATERS.

SPECIFICATION forming part of Letters Patent No. 780,475, dated January 17, 1905.

Application filed August 14, 1903. Serial No. 169,455.

*To all whom it may concern:*

Be it known that we, GEORGE E. BEHRENS, a resident of Ivoryton, in the county of Middlesex and State of Connecticut, and GEORGE TAYLOR, a resident of the city of New York, borough of Manhattan, in the county and State of New York, citizens of the United States, have invented a new and Improved Apparatus for Treating Wool-Wash Waters, of which the following is a full, clear, and exact description.

Our invention relates to an apparatus for treating wool-wash waters or "suds" obtained in the scouring operation of wool for the purpose of eliminating grease or fat, dirt, and other impurities therefrom.

One object of the present invention is to produce an improved form of apparatus wherein the refuse-laden liquid from wool-scouring machines may be treated by proper chemical agents in an economical and relatively expeditious manner for the purpose of filtering the impurities from the water and for separating the fats and grease from the dirt and other refuse.

A further object of the invention is to equip the apparatus with means by which a solvent, such as a hydrocarbon of the order of naphtha or benzin, may be expeditiously eliminated from the oil, fat, or grease and restored without appreciable waste to a commercial condition and ready for use in the apparatus.

Further objects and advantages of the invention will appear in the course of the subjoined description, and the actual scope thereof will be defined by the annexed claims.

Reference is to be had to the accompanying drawings, forming a part of this specification, in which similar characters of reference indicate corresponding parts in both the figures.

Figure 1 is a diagrammatic view, partly in section, illustrating our plant for treating wool-wash waters; and Fig. 2 is an enlarged sectional elevation through a still forming one element of the plant and adapted for the volatilization of a solvent and the consequent separation thereof from the oil and grease obtained by the treatment of the wool-wash water.

5 designates a primary receiving-tank, to which is coupled a feed-pipe 6, the latter being arranged to receive the wool-wash water as it is discharged from a wool-scouring machine. From this tank 5 leads a pipe 7, which is coupled to an ordinary pump 8, said pipe 7 being provided with a globe-valve or stop-cock 9. The eduction-pipe 10 of the pump is connected with a filter-press 11 of a construction well known to those skilled in the art, and said pipe 10 is equipped with a check-valve 12, the latter preventing back pressure of the fluid from the filter-press to the pump. This filter-press is provided with a plurality of cocks or valves 13, by which the matters contained in the press subsequent to the operation of filtering the substances under pressure may be discharged separately into a trough 14, the latter being arranged in an inclined position below the filter-press and the series of cocks 13 thereof. From this inclined trough leads a water-discharge pipe 15, having a globe-valve 16, said pipe being conducted to any suitable point where it is desired to discharge the water from the filter-press—as, for example, to a sewer.

The inclined trough is provided with a gate 17, the latter being disposed in the trough between its delivery end and the point of attachment of the pipe 15, and to the delivery-end portion of this trough is secured another pipe, 18, the gate 17 being located between the pipes 15 18. The last-mentioned pipe, 18, is coupled to a second tank 19, which is preferably supported in a raised position by a framework 20, said second tank being disposed below the filter-press and the trough in order that the oil and fats discharged from the filter-press and the trough may flow by gravity into said tank 19.

21 designates a supply-tank adapted to contain a solvent which is to be admitted to the filter-press for the purpose of separating the oil, grease, and fats from dirt and other refuse subsequent to the elimination of the waters from the solid matters by the action of the filter-press. This tank may contain any suitable solvent—such as naphtha, benzin, or other hydrocarbon—and from the tank leads a pipe 22, which is coupled to the pipe 7 at a point between the pump and the valve 9, said pipe 22 being furnished with a globle-valve 23. In the operation of pumping the liquid from the primary tank 5 to the filter-press the valve 23 must be closed to prevent the solvent from passing into the filter-press, whereas the valve 9 is opened. After the filter-press shall have been charged in all of its compartments with the wool-wash water the valve 9 should be closed to cut off communication of the primary tank 5 with the pump. The filter-press is operated in the usual way for the expression of water from the residue—such as fats, dirt, and other matter—the water escaping freely through the cocks 13 into the trough 14 and through the pipe 15 to the place of discharge, the gate 17 being closed and the valve 16 opened. The tank 21 should now be brought into service by opening the valve 23 and starting the pump 8, whereby the solvent is pumped from the tank into the press, so that it will operate on the solid residue present therein for separating the oil, fat, and grease from the dirt and refuse. The valve 16 should be closed and the gate 17 opened, after which the solvent, with the oil and fatty matters, may pass from the compartments of the filter-press through the valves 13 into the trough 14 and thence through the pipe 18 into the second tank 19.

From the lower part of the second tank 19 leads a pipe 24, the same being equipped with a globe-valve 25. Under some circumstances we equip the pipe 24 with a filter 26 of any suitable construction, said filter being adapted to contain any suitable material—such as charcoal, gravel, or the like—in order to mechanically eliminate whatever impurities that are present in the grease or oil; but we do not strictly confine ourselves to the employment of this filter. The pipe 24 is adapted to convey the oil or fatty matters and the solvent to a still, which is adapted to be heated to a temperature which is sufficient to evaporate the solvent, the fumes of the solvent being subsequently condensed in order to restore the solvent to a liquid condition and enable its return in a commercial state to the tank 21. One member of the still is a conical steam-drum 27, which is closed at its top and bottom except for an opening through which passes a pipe 28 for conveying a heating medium to the interior of the drum. The drum is provided with a helical trough or gutter 29, which is united externally to the drum, preferably by brazing said gutter to the external surface of the drum, although the parts may be united in any other suitable way. The gutter gradually increases in diameter from the upper small end of the heating-drum to the enlarged lower base portion thereof, and this gutter has its upstanding end 30 coupled in a suitable way to the lower portion of the pipe 24, whereby the solvent and fatty matters may be delivered from the tank 19 directly to the gutter of the still. The still is enveloped by a hood or casing 31, from which leads a curved pipe 32, having an end portion thereof coupled to a condensing coil or worm 33, the latter being submerged in a cold-water bath adapted to be contained in a condensing-tank 34. The coil or worm 33 is attached at its lower end to a return-pipe 35, that is coupled to the solvent-tank 21, said pipe being provided with a stop-cock 36. The spiral gutter 29 of the still is coupled at its lower end to an offbearing-pipe 37, which is attached to a storage-tank 38, said pipe 37 being provided with a stop-cock 39, which is normally closed.

The operation of the apparatus may be described as follows: The refuse from the wool-scouring machine is conveyed by the pipe 6 into the primary tank 5, where it is mixed with a reagent, which facilitates the separation of the grease from the water. The valve 23 being closed, the pump 8 is started, and the mixture is forced into the filter-press until the sections are full of the grease-cake, after which fresh water is pumped through the filter in order to wash the grease-cake. The water which is separated from the grease and dirt flows through the valves 13, and the valve 16 being opened, the water escapes through the pipe 15, and during this operation the grease and dirt which remain in the filter form into a cake. The valves 9 16 are now closed and the gate 17 and the valve 23 are opened, after which the pump is started and the solvent is forced by the operation of the pump into the filter-press. The action of the solvent on the grease-cake present in the press dissolves whatever wool-fat there is in the cake, and the solvent and the fatty matters are allowed to flow through the valves 13 and the trough 14 into the pipe 18 and thence to the tank 19. The grease or fatty matters in this condition contain the solvent which was admitted to the filter-press for the separation of the grease from the dirt, and in order to prevent any unnecessary waste of the solvent we employ the still and the condenser shown by the drawings. A heating medium, such as steam, is admitted by the pipe 28 to the heating-drum 27 for the purpose of heating the latter and the spiral gutter 29 to the proper temperature, after which the valves 25, 39, and 36 are opened. The mixture flows through the pipe 24 and the filter 26 into the spiral gutter, and as the mixture travels around the conical drum and through the gutter it is heated to a temperature sufficient to volatilize the solvent. The fumes or gases pass through the pipe or neck 32 into the worm or coil of the condenser, wherein they are condensed and restored to a liquid condition, the solvent being returned in a commercial state by the pipe 35 to the tank 21. The fatty matters which are liquefied by the action of the still escape through the pipe 37 into the storage-tank 38, after which the wool-fat may be drawn from said tank for the purpose of refining it or of selling it in a natural condition.

It is to be observed that our invention contemplates the treatment of the residuum by a solvent at a period immediately following the expression of liquid matter from said residue and while it remains in the filter-press. The admission of the solvent to the solid residue dissolves the grease and fatty matter, so as to separate the same from the dirt and impurities, and the solvent and the fatty matters are drawn from the press into the second tank, wherein they may be retained until it is desired to distil the matter. This means for and method of treating the solid matter effects material saving in the time and cost required to extract the desirable matter from the liquor because the steps involved are few in number and the solid matter is treated directly after the elimination of the liquid matter. The method involved is not only economical in the particulars recited, but the apparatus required consists of comparatively few component parts, each of which is simple in construction and operation. By dissolving the fatty matter from the refuse while the substances are in the filter-press and then drawing off the solvent and grease or oil the solid residuum may at once be pressed into cakes suitable for manure, thus saving rehandling and subsequent treatment of the residue.

Having thus described our invention, we claim as new and desire to secure by Letters Patent—

1. An apparatus for treating wool-wash water, comprising a press, valve-controlled mechanism for supplying thereto the matter to be treated, valve-controlled connections to said mechanism for supplying a solvent under pressure to the solid matters in the press, a tank to receive a mixture of the fatty matters with the solvent from said press, a still connecting with said tank having means for effecting volatilization of the solvent contained in the matters passing thereto from the tank, a storage-tank for said matters connecting with the still, and a condenser having communication with the still.

2. An apparatus for treating wool-wash water, comprising a primary tank, a pump having a valved connection with said tank, a filter-press connected directly with said pump, a solvent-tank having a valved connection with said pump, a second storage-tank, a member arranged between the said filter-press and the second tank and provided with a gate, a pipe connecting said member with said second tank, a valved water-pipe connected to said member, a still having valved connection with the second tank, and a condenser communicating with said still and having a connection with said solvent-tank.

3. In an apparatus for treating wool-wash water, the combination of a filter-press, a tank to receive a mixture of fatty matters with solvent therefrom, a still connecting with said tank having means for effecting the volatilization of the solvent contained in the matters passing thereto from the tank, a storage-tank for said matters connecting with the still, and a condenser having communication with the still.

4. An apparatus for treating wool-wash water, comprising a press, valve-controlled mechanism for supplying thereto the matter to be treated, the said mechanism including a pump having its outlet connected with the press and an inlet for the pump, valve-controlled connections to said pump-inlet for supplying a solvent under pressure to the solid matters in the press, a tank to receive the solvent with the fatty matters from the press, and a still connected with said tank.

In testimony whereof we have signed our names to this specification in the presence of two subscribing witnesses.

GEORGE E. BEHRENS.
GEORGE TAYLOR.

Witnesses:
JNO. M. RITTER,
H. T. BERNHARD.